United States Patent
Kim et al.

(10) Patent No.: US 9,536,403 B2
(45) Date of Patent: *Jan. 3, 2017

(54) ELECTRONIC SHELF LABEL AND METHOD OF DISPLAYING REMAINING BATTERY LIFE THEREOF

(71) Applicant: LG INNOTEK CO., LTD., Seoul (KR)

(72) Inventors: Ji Hye Kim, Seoul (KR); Yong Taek Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/667,070

(22) Filed: Mar. 24, 2015

(65) Prior Publication Data
US 2015/0199885 A1  Jul. 16, 2015

Related U.S. Application Data

(63) Continuation of application No. 13/326,795, filed on Dec. 15, 2011, now Pat. No. 9,013,318.

(30) Foreign Application Priority Data
Dec. 31, 2010  (KR) .................. 10-2010-0140089

(51) Int. Cl.
G08B 21/00 (2006.01)
G08B 5/36 (2006.01)
G06Q 30/06 (2012.01)
G09F 3/20 (2006.01)

(52) U.S. Cl.
CPC ............... *G08B 5/36* (2013.01); *G06Q 30/06* (2013.01); *G09F 3/208* (2013.01)

(58) Field of Classification Search
CPC ............ G08B 5/36; G06Q 30/06; G09F 3/208
USPC ....................................... 340/636.1
See application file for complete search history.

(56) References Cited

U.S. PATENT DOCUMENTS

| | | |
|---|---|---|
| 4,082,943 A | 4/1978 | Jensen et al. |
| 4,672,661 A | 6/1987 | Clark et al. |
| 5,502,382 A | 3/1996 | Ando et al. |
| 5,988,498 A | 11/1999 | Hoell |
| 6,164,538 A | 12/2000 | Furuya et al. |
| 6,292,786 B1 | 9/2001 | Deaton et al. |

(Continued)

FOREIGN PATENT DOCUMENTS

| | | |
|---|---|---|
| EP | 887757 A2 | 12/1998 |
| EP | 1152366 A2 | 11/2001 |

(Continued)

OTHER PUBLICATIONS

European Search Report dated Mar. 29, 2012 in European Application No. 11184150.8.

*Primary Examiner* — Kerri McNally
(74) *Attorney, Agent, or Firm* — Saliwanchik, Lloyd & Eisenschenk

(57) ABSTRACT

An electronic shelf label system is provided. There is provided a method in which an electronic shelf label periodically transmits its remaining battery capacity to a server in a electronic shelf label system according to the present invention, and the server converts the battery level into a remaining battery life (time) and provides the same, so that a manager can check the remaining battery life in a management mode of the server and a terminal, and easily manage an electronic shelf label using a battery.

12 Claims, 4 Drawing Sheets

(56) References Cited

U.S. PATENT DOCUMENTS

| | | |
|---|---|---|
| 6,522,361 B2 | 2/2003 | Higuchi et al. |
| 6,579,728 B2 | 6/2003 | Grant et al. |
| 6,993,498 B1 | 1/2006 | Deaton et al. |
| 7,028,220 B2 | 4/2006 | Park |
| 7,152,040 B1 | 12/2006 | Hawthorne et al. |
| 7,225,994 B2 | 6/2007 | Finkelstein |
| 7,389,439 B2 | 6/2008 | Yoon et al. |
| 7,464,050 B1 | 12/2008 | Deaton et al. |
| 7,551,149 B2 | 6/2009 | Rosander et al. |
| 7,607,580 B2 | 10/2009 | Takita et al. |
| 7,676,251 B2 | 3/2010 | Sugie et al. |
| 7,734,310 B2 | 6/2010 | Kondo et al. |
| 7,778,623 B2 | 8/2010 | Araki et al. |
| 7,954,712 B2 | 6/2011 | Babcock et al. |
| 7,973,396 B2 | 7/2011 | Minowa |
| 8,145,771 B2 | 3/2012 | Murakami |
| 8,174,462 B2 | 5/2012 | Rosander et al. |
| 8,174,463 B2 | 5/2012 | Rosander et al. |
| 8,181,874 B1 | 5/2012 | Wan et al. |
| 8,245,923 B1 | 8/2012 | Merrill et al. |
| 8,403,215 B2 | 3/2013 | Aihara et al. |
| 9,013,318 B2 * | 4/2015 | Kim .................. G06Q 30/06 340/10.1 |
| 2001/0008424 A1 | 7/2001 | Higuchi et al. |
| 2002/0017568 A1 | 2/2002 | Grant et al. |
| 2003/0046503 A1 * | 3/2003 | Park .................. G06F 11/1441 711/162 |
| 2004/0026506 A1 | 2/2004 | Finkelstein |
| 2005/0151701 A1 | 7/2005 | Rosander et al. |
| 2005/0218208 A1 * | 10/2005 | Sugie .................. G06F 3/147 235/378 |
| 2005/0218227 A1 | 10/2005 | Takita et al. |
| 2006/0015758 A1 | 1/2006 | Yoon et al. |
| 2006/0100931 A1 | 5/2006 | Deaton et al. |
| 2006/0100967 A1 | 5/2006 | Grimaldi et al. |
| 2007/0246532 A1 | 10/2007 | Nunez et al. |
| 2007/0249395 A1 | 10/2007 | Kondo et al. |
| 2007/0267502 A1 | 11/2007 | Zellner et al. |
| 2009/0198508 A1 | 8/2009 | Minowa |
| 2009/0219223 A1 | 9/2009 | Rosander et al. |
| 2009/0225000 A1 | 9/2009 | Rosander et al. |
| 2009/0228225 A1 * | 9/2009 | Burgess ............. G01R 31/3651 702/63 |
| 2009/0254419 A1 | 10/2009 | Mochizuki et al. |
| 2009/0303018 A1 | 12/2009 | Catteau |
| 2010/0065632 A1 | 3/2010 | Babcock et al. |
| 2010/0287057 A1 | 11/2010 | Aihara et al. |
| 2011/0011936 A1 | 1/2011 | Morandi et al. |
| 2011/0102155 A1 | 5/2011 | Choi et al. |
| 2011/0186633 A1 | 8/2011 | Okabe et al. |
| 2011/0234375 A1 | 9/2011 | Kono et al. |
| 2012/0169477 A1 | 7/2012 | Seo et al. |
| 2013/0117153 A1 | 5/2013 | Shen |

FOREIGN PATENT DOCUMENTS

| | | |
|---|---|---|
| JP | 11079155 A | 3/1999 |
| JP | 2001209845 A | 8/2001 |
| JP | 2008217738 A | 9/2008 |
| JP | 2009-217198 A | 9/2009 |
| JP | 2010-194125 A | 9/2010 |
| JP | 2010194125 A | 9/2010 |
| JP | 2011210227 A | 10/2011 |
| WO | WO-2007009999 A1 | 1/2007 |

* cited by examiner

ELECTRONIC SHELF LABEL AND METHOD OF DISPLAYING REMAINING BATTERY LIFE THEREOF

CROSS-REFERENCE TO RELATED APPLICATIONS

This application is a continuation of U.S. application Ser. No. 13/326,795, filed Dec. 15, 2011, which claims priority to Korean Application No. 10-2010-0140089, filed Dec. 31, 2010, the disclosures of each of which are incorporated herein by reference in their entirety.

BACKGROUND

Field of the Invention

The present invention relates to an electronic shelf label and a method of displaying a remaining battery life thereof.

More particularly, there is provided a method in which an electronic shelf label using a battery periodically transmits its remaining battery capacity to a server in a electronic shelf label system according to the present invention, and the server converts the remaining battery capacity into a remaining battery life (time) and provides the same, so that a manager can check the remaining battery life in a management mode of the server and a terminal, and easily manage the electronic shelf label.

Description of the Related Art

Of late, retailers such as warehouse stores have adopted an electronic shelf label (ESL) system to display price information. The electronic shelf label system is a system for displaying information regarding a large number of products, such as real-time pricing, unit costs, bar codes, and the like, by using electronic shelf labels attached to shelving in large stores or convenience stores. In Europe, the use of electronic shelf labels have been generalized, while in domestic distribution stores, paper price tags rather than electronic shelf labels are still in widespread use. However, it is expected that the electronic shelf labels will replace paper price tags within the next few years.

Such electronic shelf labels use batteries in most cases, but a method for managing a remaining battery capacity in a server does not exist. In order to manage tens to hundreds of electronic shelf label terminals, a method in which a server manages the remaining battery capacities thereof is in need.

BRIEF SUMMARY

Accordingly, the present invention is directed to an electronic shelf label and a method of displaying a remaining battery life thereof that substantially obviate one or more problems due to limitations and disadvantages of the related art.

An object of the present invention is to provide a method of efficiently managing an electronic shelf label system including a battery by providing a remaining battery capacity of an electronic shelf label terminal to a server in the electronic shelf label system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an electronic shelf label including: a battery supplying power; a communication module transmitting information regarding a remaining battery capacity of the battery to a server, and receiving information regarding a remaining battery life corresponding to the remaining battery capacity; a display displaying product information and a price; a user input unit receiving a user input; and a controller checking the remaining battery capacity of the battery, and displaying the received information regarding the remaining battery life according to the user input.

In another aspect of the present invention, there is provided a method of displaying a remaining battery life of an electronic shelf label, including: checking a remaining battery capacity of a battery; transmitting information regarding the remaining battery capacity to a server; receiving information regarding a remaining battery life corresponding to the remaining battery capacity; and displaying the received information regarding the remaining battery life according to a user input.

According to exemplary embodiments of the present invention, a server can easily check remaining battery capacities of a plurality of electronic shelf label terminals in an electronic shelf label system.

According to exemplary embodiments of the present invention, each of the electronic shelf label terminals can convert its remaining battery capacity into a remaining battery life, and display the remaining battery life.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, exemplary embodiments of the present invention will be described in more detail with reference to accompanying drawings.

Figure 1:
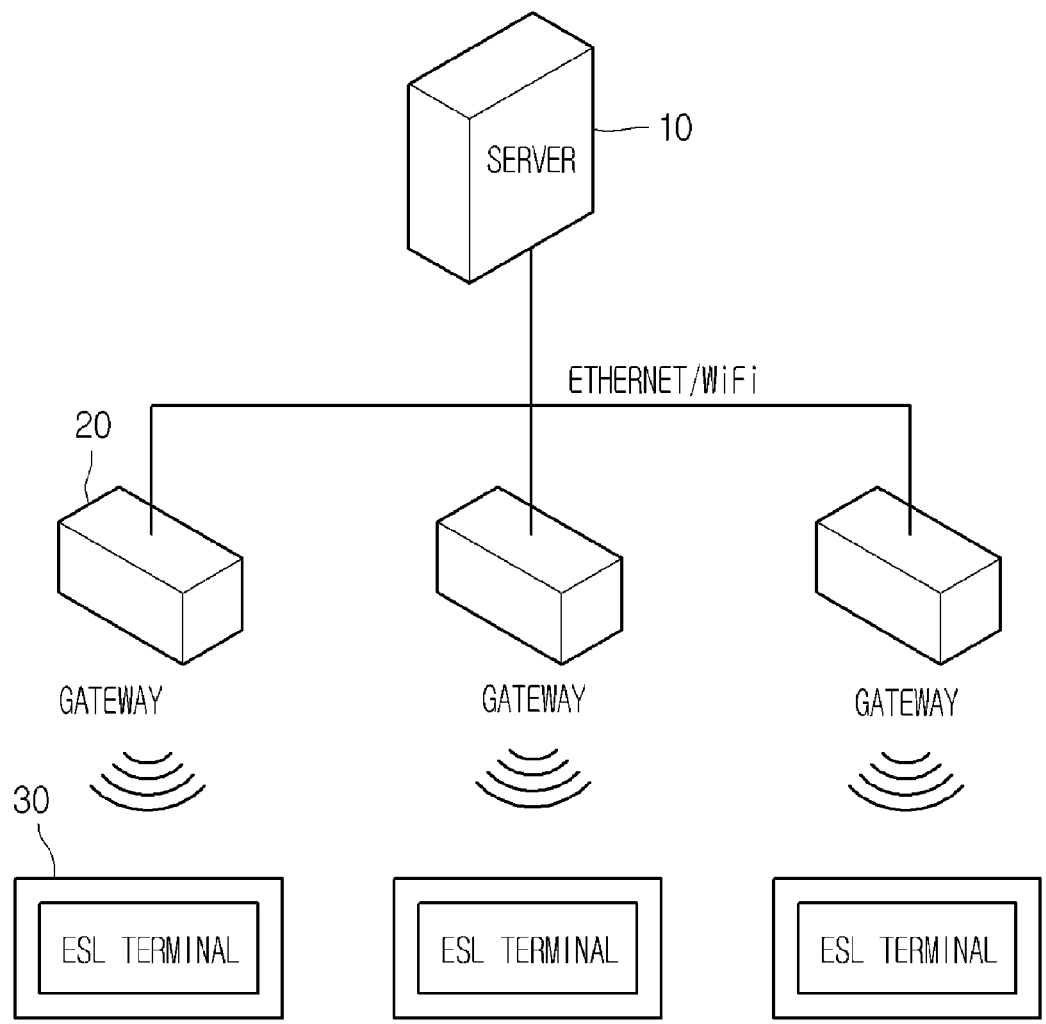
FIG. 1 is a view illustrating a network configuration of an electronic shelf label (ESL) system according to an exemplary embodiment of the present invention.

FIG. 1 is a view illustrating a network configuration of an electronic shelf label (ESL) system according to an exemplary embodiment of the present invention.

Referring to FIG. 1, electronic shelf labels (i.e., ESL terminals) 30 are attached to shelving in a store such as a warehouse store, a shop or the like, and display information regarding products, such as prices and the like. Each of the electronic shelf labels 30 communicates with a server 10 via an adjacent gateway among a plurality of gateways 20.

A console is connected to the server 10, and a store manager may use the console to control the server 10, and the gateways 20 and the electronic shelf labels 30 which communicate with the server 10.

Figure 2:
FIG. 2 is a view illustrating one example of an ESL.

The store manager may transmit data containing information regarding products to be displayed, such as prices, product images, discount information, bar codes and the like, to the electronic shelf label 30 through the server 10, and causes the data to be displayed on the electronic shelf label 30. FIG. 2 illustrates one example of the electronic shelf label 30. As shown in FIG. 2, a product name, a price, a barcode and the like may be displayed on the electronic shelf label 30, and an image or information to be displayed may be changed by the server 10.

The gateways 20 may be connected to the server 10 by cable or wirelessly, and communication therebetween is achieved through Ethernet or WI-FI for example.

The gateways 2 and the electronic shelf labels 30 are connected with each other wirelessly, for example, by Zigbee, Wi-Fi or Ultra-Wide Band (UWB).

Each of the electronic shelf labels 30 operates by a built-in battery, and displays data received from the server 10. The electronic shelf label 30 may be provided with a display which consumes power only when a displayed image is changed, for example, a bitstable cholesteric display (BCD) or an electronic ink display. Furthermore, the electronic shelf label 30 periodically transmits information regarding a remaining battery capacity to the server 10, and a manager of the server 10 converts the received remaining battery capacity into a remaining battery life, and transmits information regarding the remaining battery life to the electronic shelf label 30.

Each of the electronic shelf labels 30 has a unique identification (ID), and the server 10 may use this ID as an address to communicate with the electronic shelf label 30.

The ID is set when a store manager initially installs the electronic shelf label 30 on shelving in a store. The store manager assigns an ID to each electronic shelf label 30 by using a hand-held device, and registers the ID in the server 10.

After the electronic shelf label 30 is registered in the server 10, the store manager may change an image displayed on the electronic shelf label 30 through the server 10, and control the electronic shelf label 30 by transmitting various control commands.

Figure 3:
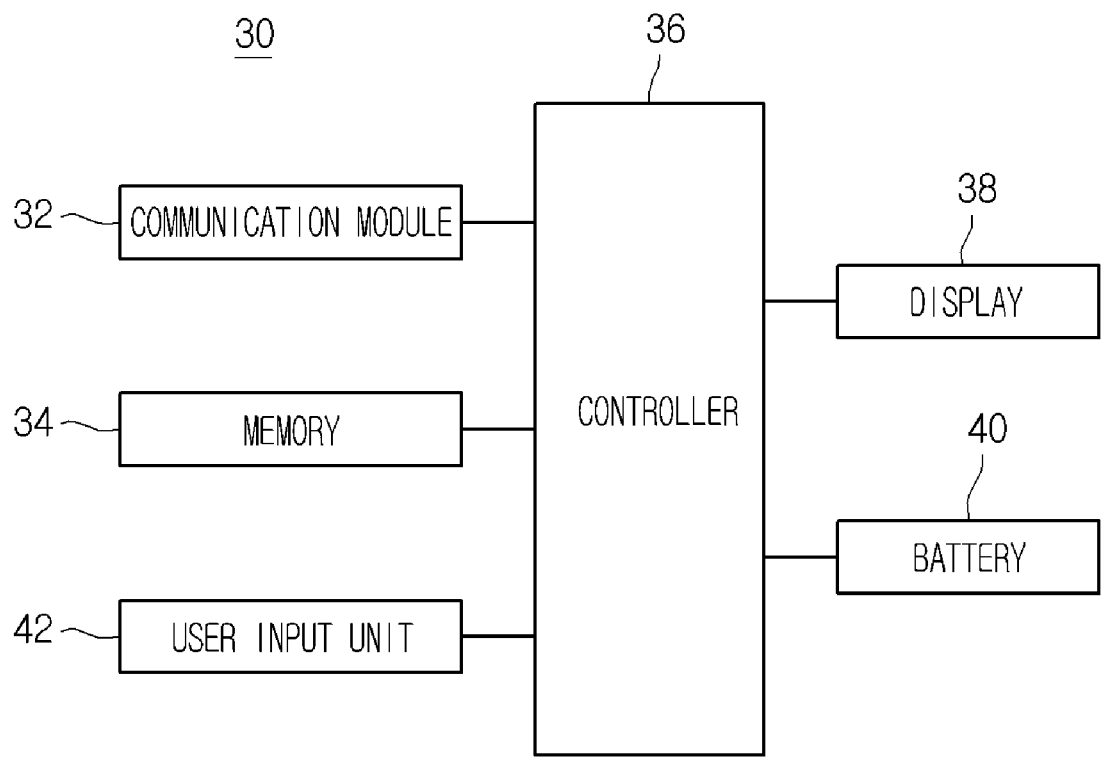
FIG. 3 is a view illustrating the configuration of an ESL according to an exemplary embodiment of the present invention.

FIG. 3 is a view illustrating the configuration of the ESL terminal according to an exemplary embodiment of the present invention.

As shown in FIG. 3, the electronic shelf label 30 according to an exemplary embodiment of the present invention includes a battery 40 supplying power, a communication module 32 transmitting information regarding a remaining battery capacity of the battery 40 to the server 10 and receiving information regarding a remaining battery life corresponding to the remaining capacity of the battery 40, a display 38 displaying product information and prices, a user input unit 42 checking the remaining capacity of the battery 40 and receiving a user input, and a controller 36 displaying the received information regarding the remaining battery life according to the user input.

The communication module 32 communicates with the server 10 via the gateway 20 depicted in FIG. 1. The communication module 32 may be a near-field communication module, such as a Zigbee communication module, a Wi-Fi communication module, or a UWB communication module.

The display 38 may utilize any display. In order to reduce power consumption, a display achieving low small power consumption and consuming power only when a displayed image is updated may be used, for example, a bitstable cholesteric display (BCD) or an electronic ink display.

The memory 34 stores an instruction code for controlling the operation of the controller 36, and also stores data received from the server 10. The memory 34 may utilize any storage device such as a flash memory, an Electronic Erasable Programmable Read Only Memory (EEPROM) or the like.

The user input unit 42 is a device to which a manager inputs a user command to see information through the display 38 of the electronic shelf label 30. For this, the manager moves to where each electronic shelf label 30 is located. As will be described later, the user input unit 42 may be a magnetic sensor. As the manager brings a magnet close to the magnetic sensor, the controller 36 may detect a management mode and display information required for management rather than product information. The information required for management may include, for example, a remaining battery life, an ID or a bar code of the electronic shelf label 30, and the like. Besides, the user input unit 42 may include a switch for turning off the electronic shelf label 30.

Figure 4:
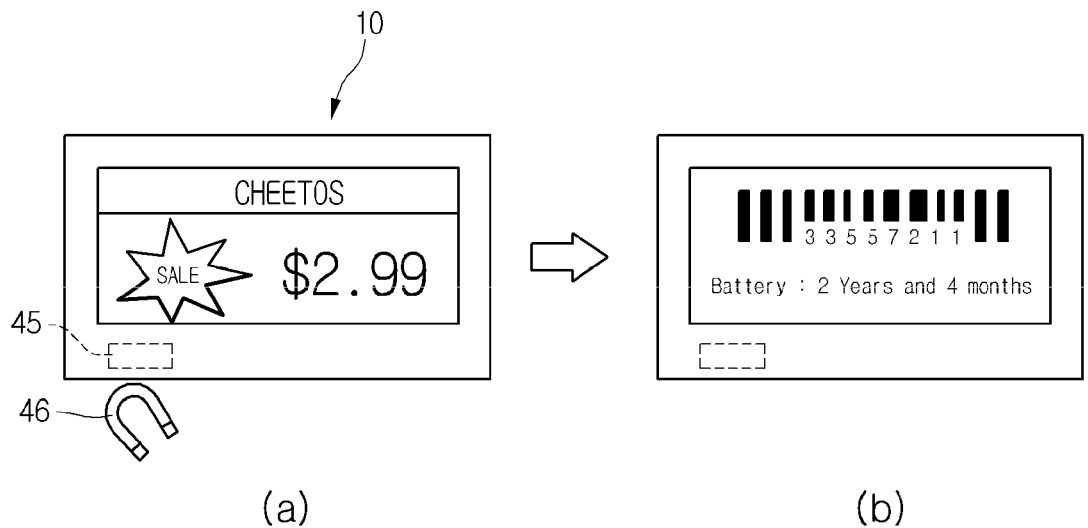
FIG. 4 is a view for explaining a method in which a manager checks a remaining battery capacity of the ESL according to an exemplary embodiment of the present invention.

FIG. 4 is a view for explaining a method in which a manager checks a remaining battery capacity of the electronic shelf label 30.

Part A of FIG. 4 illustrates an electronic shelf label displaying product information under normal situations, and part B of FIG. 4 illustrates the electronic shelf label in the management mode.

According to an exemplary embodiment of the present invention, a magnetic sensor 45 may be installed in the electronic shelf label 30. The magnetic sensor 45 may utilize a hall sensor, and is included in the user input unit 42. When the manager brings a magnet close to the magnetic sensor 45, the mode of the electronic shelf label 30 is changed into a management mode, thereby displaying an image as shown in part B of FIG. 4. As shown in part B of FIG. 4, a bar code representing the ID of the electronic shelf label 30 and information regarding a remaining battery life may be displayed in the management mode. The information regarding the remaining battery life is information received from the server 10.

Figure 5:
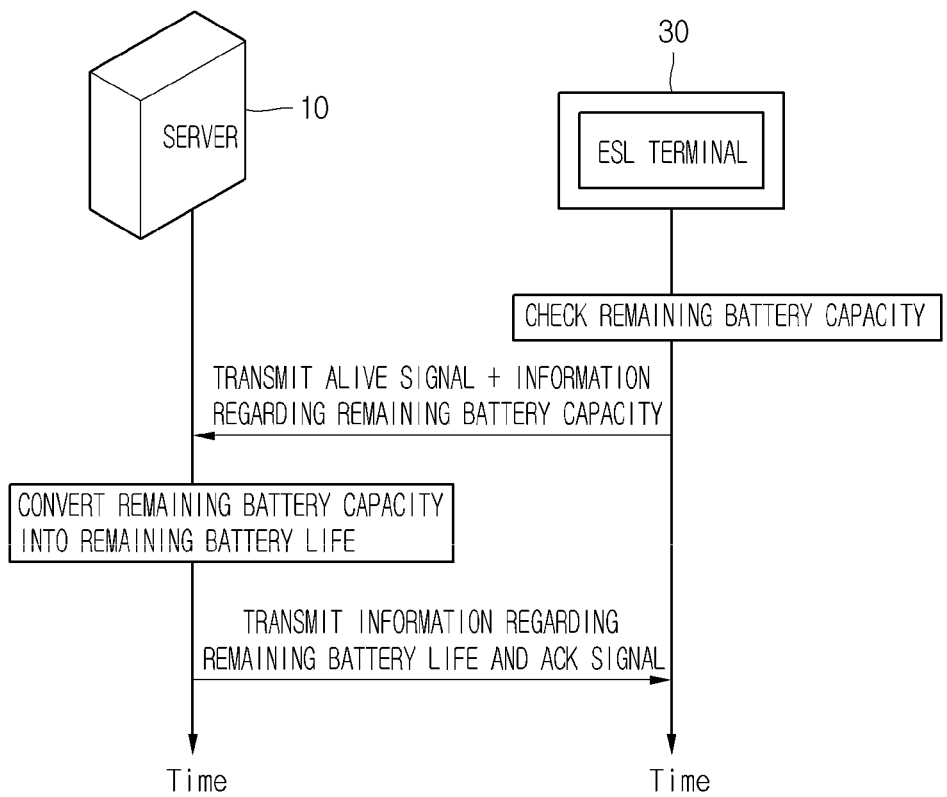
FIG. 5 is a diagram illustrating a method of managing a remaining battery capacity for a plurality of ESLs, according to a time line.

FIG. 5 is a diagram illustrating a method of managing a remaining battery capacity for a plurality of ESL terminals according to a time line, according to an exemplary embodiment of the present invention.

According to an exemplary embodiment of the present invention, each of the electronic shelf labels 30 periodically checks its remaining battery capacity, and transmits information regarding the remaining battery capacity to the server 10. The electronic shelf label 30 periodically transmits an Alive signal to the server 10. At this time, the electronic shelf label 30 transmits information regarding its remaining battery capacity, as well as the Alive signal.

The server 10 receives the information regarding the remaining battery capacity and converts it into a remaining battery life. Thereafter, the server transmits information regarding the remaining battery life to the electronic shelf label 30. In this case, the server 10 needs to transmit a reception acknowledgement signal (i.e., an ACK signal) in response to the Alive signal, and thus may transmit the information regarding the remaining battery life along with the ACK signal.

The server 10 stores information regarding a remaining battery capacity of each electronic shelf label 30, and is periodically updated. The manager may check the remaining battery capacity of each electronic shelf label 30 through the console connected to the server 10.

Figure 6:
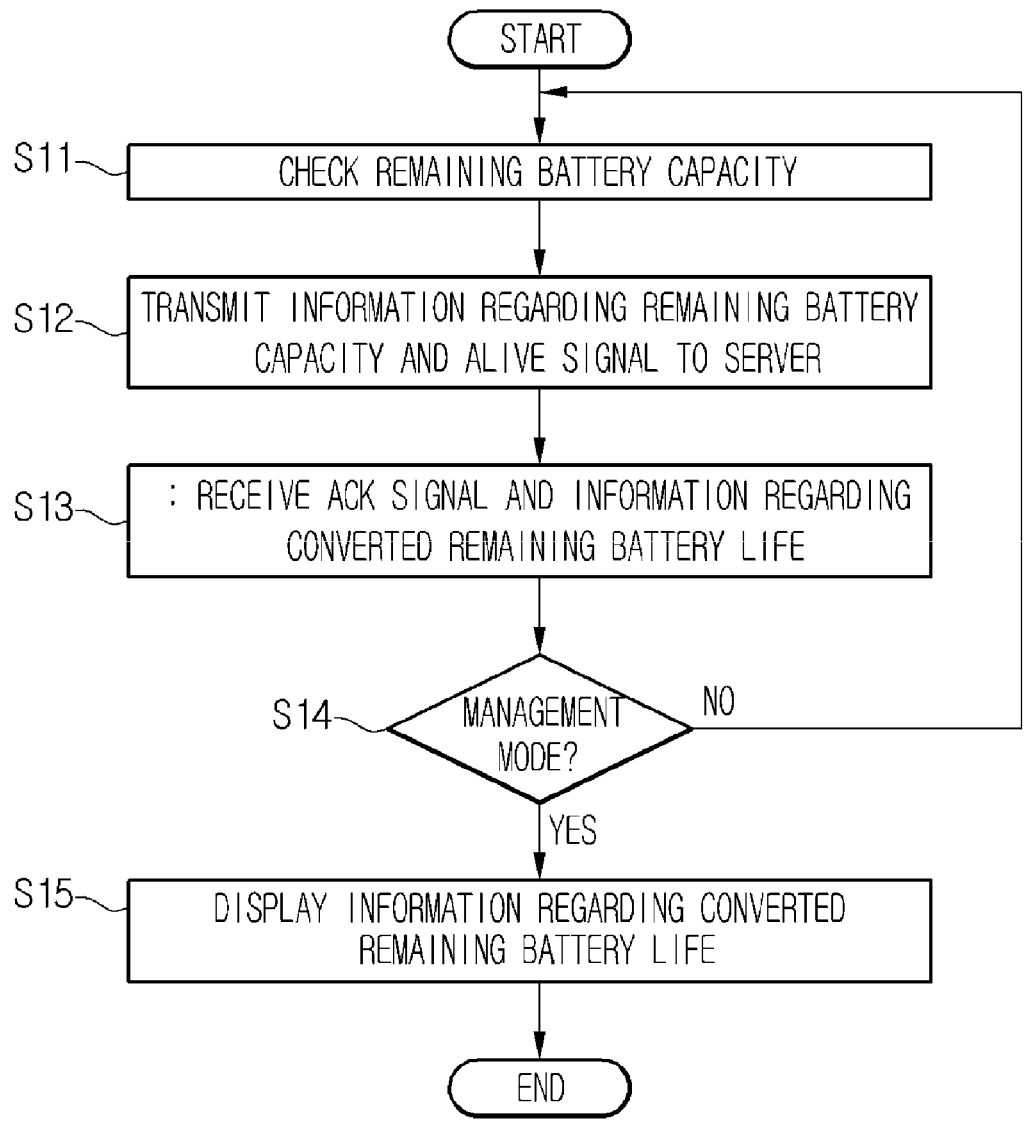
FIG. 6 is a flowchart illustrating a method of managing a remaining battery capacity for a plurality of ESLs according to an exemplary embodiment of the present invention.

FIG. 6 is a flowchart illustrating a method of managing a remaining battery capacity for a plurality of ESL terminals according to an exemplary embodiment of the present invention.

In operation S11, each of the electronic shelf labels 30 checks its remaining battery capacity.

In operation S12, the electronic shelf label 30 transmits information regarding its remaining battery capacity, along with an Alive signal which is periodically transmitted.

In operation S13, the electronic shelf label 30 receives information regarding a remaining battery life along with an ACK signal from the server 10. If the ACK signal is not received, the electronic shelf label 30 retransmits the Alive signal and the information regarding its remaining battery capacity.

When entering into a management mode in operation S14, the electronic shelf label 30 displays information regarding the converted remaining battery life in operation S15. As shown in FIG. 4, as the manager brings a magnet close to the electronic shelf label 30, the electronic shelf label 30 may enter the management mode.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An electronic shelf label comprising:
a battery supplying power;
a communication module transmitting information regarding a remaining battery capacity of the battery to a server, and receiving information regarding a remaining battery life corresponding to the remaining battery capacity;
a display displaying product information and a price;
a user input unit receiving a user input; and
a controller checking the remaining battery capacity of the battery, and displaying the received information regarding the remaining battery life according to the user input;
wherein the information regarding the remaining battery capacity of the battery is transmitted to the server along with an Alive signal that is periodically transmitted to the server.

2. The electronic shelf label according to claim 1, wherein the information regarding the remaining battery life is received from the server, along with a reception acknowledgement signal in response to the Alive signal.

3. The electronic shelf label according to claim 2, wherein when the reception acknowledgement signal in response to the Alive signal is not received, the controller retransmits the information regarding the remaining battery capacity and the Alive signal.

4. The electronic shelf label according to claim 1, further comprising a magnetic sensor,
wherein the user input is a magnet detected by the magnetic sensor.

5. The electronic shelf label according to claim 1, wherein the controller displays management information for the electronic shelf label, together with the received information regarding the remaining battery life.

6. The electronic shelf label according to claim 1, wherein a unique identification assigned to the electronic shelf label is registered in the server,
wherein the server uses the unique identification as an address to communicate with the electronic shelf label,
wherein the controller changes a mode of the electronic shelf label into a management mode when the user input is received through user input unit, and displays on the display the unique identification and the information regarding the remaining battery life.

7. A method of displaying a remaining battery life of an electronic shelf label, the method comprising:
checking a remaining battery capacity of a battery;
transmitting information regarding the remaining battery capacity to a server;
receiving information regarding a remaining battery life corresponding to the remaining battery capacity;
displaying the received information regarding the remaining battery life according to a user input; and
periodically transmitting an Alive signal to the server,
wherein the information regarding the remaining battery capacity is transmitted together with the Alive signal.

8. The method according to claim 7, further comprising receiving a reception acknowledgement signal in response to the Alive signal from the server,
wherein the information regarding the remaining battery life is received together with the reception acknowledgement signal.

9. The method according to claim 8, further comprising retransmitting the information regarding the remaining battery capacity and the Alive signal, when the reception acknowledgement signal is not received in response to the Alive signal.

10. The method according to claim 7, wherein the electronic shelf label includes a magnetic sensor,
wherein the information regarding the remaining battery life is displayed when the magnetic sensor detects an approach of a magnet to the magnetic sensor.

11. The method according to claim 7, wherein the received information regarding the remaining battery life is displayed together with management information for the electronic shelf label.

12. The method according to claim 7, wherein a unique identification assigned to the electronic shelf label is registered in the server,
wherein the server uses the unique identification as an address to communicate with the electronic shelf label, and
wherein a mode of the electronic shelf label is changed into a management mode when the user input is received, and the unique identification is displayed with the information regarding the remaining battery life.

* * * * *